March 16, 1965 W. C. MOHR 3,173,974
METHOD AND APPARATUS FOR DRY-PRESSING CERAMIC OBJECTS
Filed Oct. 1, 1959

INVENTOR
WILLIAM C. MOHR

BY *Ely, Pearne & Gordon*

ATTORNEYS

United States Patent Office 3,173,974
Patented Mar. 16, 1965

3,173,974
METHOD AND APPARATUS FOR DRY-PRESSING CERAMIC OBJECTS
William C. Mohr, New Castle, Pa., assignor to Shenango China, Inc., New Castle, Pa., a corporation of Pennsylvania
Filed Oct. 1, 1959, Ser. No. 843,694
11 Claims. (Cl. 264—40)

This invention relates to apparatus and methods for forming ceramic articles and relates more particularly to the manufacture of ceramic objects, especially dinnerware and fine china, from charges of dry pulverulent clays or other dry pulverulent ceramic material rather than from clays or similar ceramic material in a moist plastic condition, or from liquid clay slips or the like. The pressure-molding of dry pulverulent ceramic material is commonly known in the art as "dry-pressing."

The dry-pressing of clays has been practiced for many years in forming several types of ceramic objects—particularly the so-called electrical porcelains, ceramic parts for industrial and mechanical applications, certain building materials, and the like. The advantages of dry-pressing are several, principally the elimination of time, plant equipment, labor and lost material entailed in the methods of forming the clays while they are in a wet condition. Thus, for example, it has long been recognized that if it were possible to form marketable plates and like dinnerware by dry-pressing, rather than by the conventional process of jiggering plastic clay, the following items of cost and loss would be largely eliminated: (a) The processing time, risk of contamination, and large equipment involved in blunging the clay slip. (b) The labor, filtering equipment and supplies, and substantial clay loss involved in filtering the clay slip. (c) The equipment and operating costs of pug-milling the filter cakes into suitable bats of plastic clay for jiggering. (d) The labor, machinery and relatively short-lived plaster molds involved in jiggering, and the cost of reprocessing the recoverable portion of the scrap clay produced during jiggering. (e) The loss of green ware due to drying shrinkage cracks and the equipment and operating costs of the drying rooms or ovens, as well as the costs of inspecting ware for drying shrinkage cracks. (f) The loss of ware due to shrinkage and warping during firing (attributable in part, at least, to the so-called "plastic memory" imparted to the clay during pug-milling and jiggering). The same or comparable costs and losses are encountered in forming articles by other processes using wet clays, as by wet-pressing, slip-casting, and the like.

However, the art, though well aware of the advantages of dry-pressing and the cumulative costs and losses of other processes, has continued to use processes other than dry-pressing for forming any ceramic ware in which significant characteristics of a marketable product were (1) uniformity of color and appearance (under transparent or translucent glazes), (2) uniform acceptance of fine or thin glazes by the body, and (3) uniform texture and strength of the body. Unfortunately, dry-pressing as performed heretofore was unable to produce ware having such characteristics and, therefore, was not regarded as an available process for the production of ceramic products such as dinnerware, and other ware or like objects having complex shapes.

Many explanations were given for the prior failure of dry-pressing methods to produce satisfactory dinnerware, for example, such as the fact that the type of clay mixtures or bodies commonly used for dry-pressing differed substantially from those ordinarily used for dinnerware. But it has always been recognized that one problem encountered in the production of any ceramic product by dry-pressing has been the resistance of the dry charge to flow under the pressure of the dies, and thus a resistance to uniform compacting of the charge during dry-pressing. To overcome this problem, various expedients are commonly used, as such as including a wax in the charge mix to function as a lubricant in order to promote flow, vibrating the dies during pressing, employing complex multi-part dies, and the like. None of such expedients, however, produced dry-pressed green ware suitable to be fired to marketable, high quality dinnerware.

The outstanding object and advantage of this invention is that I am able to produce by dry-pressing procedures, with all attendant advantages and economies, ceramic articles of uniform density, glaze acceptance, body color, and texture sufficient for high quality dinnerware. Although the advantages of this invention appear to be most promising in the dinnerware field, it will of course be useful in producing other types of ceramic articles and will improve the quality of ceramic articles now produced by dry-pressing operations.

Articles may be produced in the manner and by the means contemplated by the present invention without necessarily employing elaborations such as compound mold movements and vibration resorted to by the prior art, although it should be understood that the invention is not necessarily limited in all aspects to the exclusion of any or all such elaborations of the prior art.

The invention embodies the discovery that articles meeting the requirements of the quality factors mentioned above may be successfully dry-pressed by simple methods and apparatus where rubber or like elastomeric mold or die faces or linings are employed in connection with pressing molds in the manner more fully described below. The invention makes it possible to form articles meeting the requirements of the above mentioned quality factors even when the shape of the article is such that re-entrant mold surfaces must be employed in the pressing mold.

The action of the elastomeric mold surfaces in promoting uniformity of charge distribution and uniformity of the formed ceramic product is not fully understood. It is presently believed that, at least at the terminal portion of pressing movement, the elastomeric mold or die surfaces and the charge in the mold or die cavity together coact to establish throughout their combined volume a continuum of uniform pressure to thereby achieve a condition of homogeneity throughout the body of the pressed green article. Such coaction would necessarily involve "give and take" by the yielding elastomeric face. However it has been surprisingly found that any such coaction as there may be does not compromise the dimensional uniformity of the formed article from segment to segment around its extent, such uniformity being comparable to or even superior to that of ware of otherwise similar properties as made by conventional manufacturing methods.

However, regardless of theories as to the action of the elastomeric mold surfaces, the results are empirically so superior that even china dinnerware of good quality may be formed by the methods and apparatus of the invention. Thus, dinnerware of good quality may be formed even though its cross-section may be relatively thin at the rim and in the center but involve a sudden or abrupt increase in thickness at the foot formed by a recess in the die providing a molding surface for the underside of the article.

The above and other advantages and features of the invention may become more fully apparent from the following description of examples of the invention together with the accompanying drawings, in which.

Figure 1:
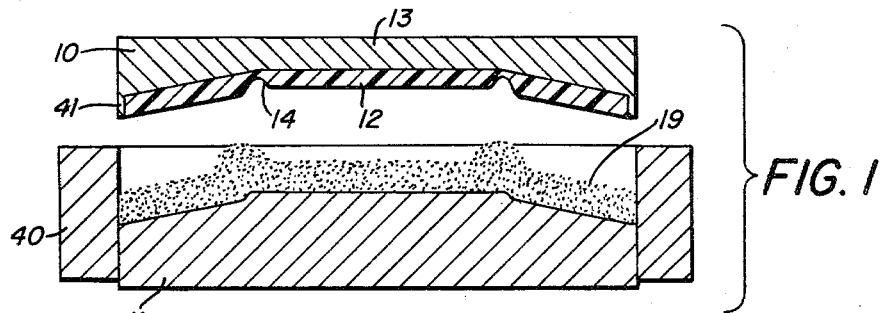
FIGURE 1 is a schematic view of apparatus for forming ceramic articles according to the invention.
Figure 3:
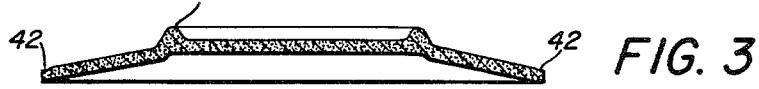
FIGURE 3 is a view showing the object formed in the apparatus of FIGURES 1 and 2.

Shown in FIGURE 1 is ware pressing apparatus comprising mating die sections which in the particular instance include upper and lower die sections 10 and 11 which define a cavity corresponding to the shape of the object to be formed. A ring 40 defines the periphery of the cavity and telescopingly receives one or both of the die members 10 and 11 in a well known manner. The drawings show the formation of dinner plates or saucers or the like since the presently most promising aspect of the apparatus is in the manufacture of tableware. Thus, the die cavity defined by the mold sections 10 and 11 corresponds to the shape of a dinner plate. At least one of the die sections comprises an elastomeric die face 12 which is supported on the relatively rigid base portion 13 of the die section and the peripheral portion of which may be protected against wear by a metal lip or extension 41 of the base portion 13. The elastomeric die face 12 has formed therein abruptly re-entrant recesses 14 which correspond to the abruptly salient surfaces on the articles to be formed, i.e., in the particular illustration they comprise the pedestal rib or foot rib 15 (FIGURE 3) of the dinner plates being formed.

In the practice of the method contemplated by the invention, apparatus, such as that shown in FIGURE 1, is charged with a dry pulverulent ceramic charge 19. Where abruptly salient surfaces are to be formed, it is desirable to at least roughly pre-shape the charge, although it will be understood that any advantages achieved by such pre-shaping are sharply limited by at least two factors. The first limiting factor is that there is an upper limit to the slope or steepness or piling angle which any given charge can hold in a self-sustaining condition. Ideal procedures would require the slope of the charge to be increased by a multiple (equal to the compression ratio during the pressing operation) of the corresponding desired slope in the formed article. For example, with a compression ratio of 3:1, a requirement of a final slope of 6:1 would ideally require a piling angle equivalent to a slope of 18:1, an obviously impossible requirement for most charges. Correspondingly, it is impossible in many instances to pre-shape the charge ideally so that the thickness of each portion thereof is a multiple (equal to the compression ratio) of the desired final thickness of such portion.

A second limiting factor in the advantages to be realized by pre-shaping is that, even assuming ideal piling is accomplished, nevertheless the highly or steeply piled portions of the charge are knocked down by the upper die member prior to full closing. Although compound mold movements may somewhat reduce this factor, it can be altogether eliminated, if at all, only in the molding of shapes of far less complexity than that of dinnerware.

Nevertheless, pre-shaping of the charge does serve to increase the variety of shapes which may be wholly satisfactorily formed according to the invention, and in this connection the charge 19 is illustrated in FIGURE 1 as being pre-shaped to shape approximating in exaggerated form the shape of the pressed green article. Such piling may be accomplished, for example, by placing an excess of charge on the die 11, and sweeping such charge with a suitably profiled board or member rotating in coaxial relationship with the die. The ring 40 may be temporarily lowered or otherwise suitably positioned to permit excess charge to fall away.

With the profiled board removed and the parts positioned as shown in FIGURE 1, the die sections are then brought together to dry-press the charge between the die sections. The compacted charge is formed into the desired plate with a uniform compacting in all parts, even throughout vicinities of the abrupt variations in cross-sectional thickness such as at the foot rib 15. There is thus achieved a uniformity of density of the dry-pressed charge which is satisfactory for glazed dinnerware, and which in many instances is superior to conventionally formed dinnerware in the degree of uniformity. This in turn results in improvement in uniformity of firing shrinkage and reduction or elimination of warping and cracking during firing of the ware from its green stage to its matured condition.

Figure 4:
FIGURE 4 shows the object of FIGURE 3 as it would appear after fettling.

The rigidity of the lip 41 relative to the elastomeric face 12 causes the formation of a small ledge 42. Also, the rim of the ware is relatively cylindrical in shape and a slight flash may also occur. Suitable fettling by means well known to the art removes such irregularities and accomplishes the formation of the desired rim profile, such as the circular profile of the ware piece shown in FIGURE 4.

Figure 5:
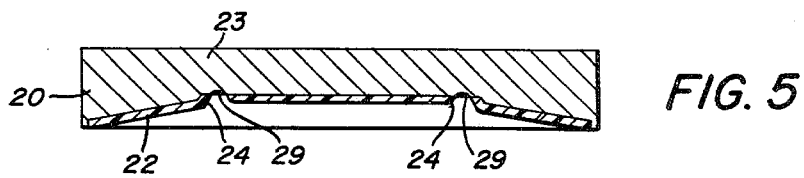
FIGURES 5 and 6 are views of other die members which may be used in apparatus embodying the invention.

The elastomeric face contemplated by the invention should comprise more than a mere coating or film of elastomer or the like. It should have a thickness which is of the same order as that of the protrusions or irregularities or re-entrant portions of the article to be formed or as that of the cavity. However, it need not necessarily wholly include the portions of the die face which define such protrusions or re-entrant portions or the like. For example, as shown in FIGURE 5, an apparatus may be provided having an upper die section 20 which is identical in all respects to the upper die section 10 except that the elastomeric die face 22 is provided with a groove 24 which is cut completely through the elastomeric face 22 and extends into the base portion 23 of the die 20 so that the root portion of this groove comprises a groove 29 cut in the metal body of the die base 23. Here it will be seen that the elastomeric face 22 has a thickness which is at least of the same order as the protrusion to be formed although it does not wholly include the portions of the die face which define such protrusions.

Figure 2:
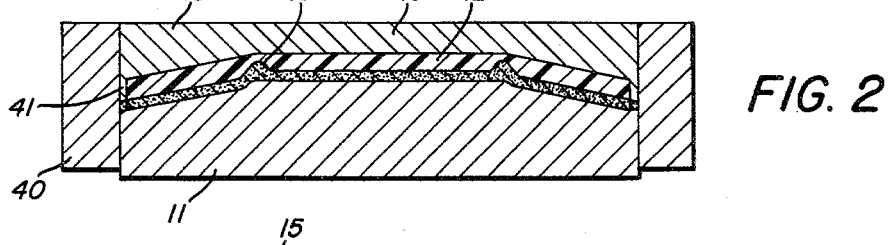
FIGURE 2 is a view similar to FIGURE 1 showing a subsequent stage in the operation of the apparatus.

As shown in FIGURES 1, 2 and 5, the rigid portion of a die supporting the resilient ware-shaping face preferably at least generally conforms to the overall contour of the article to be formed. The resilient facing is of sufficient thickness to permit the requisite substantially uniform compacting of the dry powdered charge. It presently appears that a preferred minimum thickness of the resilient facing is approximately $\frac{1}{16}$ of an inch for contours such as are generally encountered in dinnerware and employing a powdered charge having an average particle size ranging between 60 to 150 mesh. In some applications, such as where fine powdered clays are employed, the changes in contour of the die cavity are gradual, and the charge is distributed in the cavity prior to pressing so that minimal flow is required, a resilient facing of a thickness in the order of $\frac{1}{32}$ of an inch may be feasible.

Figure 6:
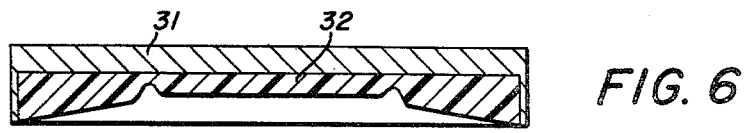

While care should be exercised in selecting a minimum thickness for the resilient die facing if best results and adequate die life are desired, there appears no maximum thickness for the resilient facing other than mere practicality. Nor is it necessary that the rigid support for the resilient portion of the die conform to the contours of the resilient molding surface or perform any function other than supporting and confining the resilient portion during molding. Thus, as shown in FIGURE 6 the rigid support for the resilient portion of the die need be no more than a relatively sturdy box 31 in which is supported a block of rubber or like material 32 having a suitably contoured die surface.

The pulverulent ceramic material is characterized by a low moisture content but is not necessarily free of any moisture. Generally, the "dry" pulverulent material has a moisture content in the order of three percent of the absolutely dry weight of powdered solids. Other compositions may vary from substantially zero to six or seven or even ten percent moisture. The upper limit for moisture varies, depending upon the nature and character of the dry powdered charge. For any given charge, the practical minimum limits of permissible water content for satisfactory results appear to be reached when any free water is expressed from the charge during compacting so as to promote sticking of the green ware to the die surfaces and interfere with the ready release of the molded charge from the die.

Any natural or synthetic rubber or similar rubbery organic elastomeric material capable of relatively incompressible hydraulic flow under pressure and at least fairly rapid restitution upon release of pressure appears to be satisfactory for the resilient die surfaces. Natural or synthetic rubbers of the type known as tread stock have proved especially satisfactory.

While the dies shown in the specific embodiment of the apparatus employed according to the invention are two-part mating male and female members defining a die cavity, this invention is not confined in all aspects to such dies having this minimum number of separable parts or to the production of articles capable of being formed in two-part molds. It is also to be understood that substantially any number of protrusions from the general contours of the molded article may be formed according to this invention.

The invention is broadly applicable to the production of many types of ceramic shapes. The several variations thereof described above will demonstrate that the scope of the invention extends beyond the details of the specific embodiments which I have practiced and herein disclosed and will make it clear that the scope of the invention is not limited by all the precise details of any one such specific embodiment. What I claim as my invention is defined in the following claims.

What is claimed is:

1. Apparatus for dry-pressing ceramic ware comprising a pair of opposing dies having rigid backs, said dies being relatively movable toward each other to define and enclose a die cavity and away from each other to open said die cavity for filling the same with a charge of relatively dry pulverulent ceramic material having an uncompacted volume greater than the volume of said die cavity and for removing the charge compacted in the form of the die cavity by the closing of said dies, said die cavity, when closed, having a maximum thickness, measured in a direction parallel to the direction of movement of the dies while compacting said charge, many times less than the maximum width of said die, measured in a plane perpendicular to the direction of said movement, the faces of said die being contoured with respect to said plane, substantially the entire surface of one of said die faces has a surface layer of elastomeric resilient material of a contour, before closing the die, corresponding to the contour desired in the ware to be formed in the die cavity, and substantially the entire surface of the opposite die of said relatively movable pair of dies is rigid whereby said resilient die face causes flow of the dry pulverulent ceramic material in a direction having a component transverse the said thickness of the die cavity while compacting said charge to uniform density.

2. Apparatus as defined in claim 1 in which the faces of the opposing die are differently contoured to form a compacted charge of varying thicknesses across the width of said die cavity.

3. Apparatus as defined in claim 1 including a third member closing the boundaries of the die cavity formed by said movable dies.

4. Apparatus as defined in claim 1 in which a portion of the contour of the die having a resilient die face extends through said resilient face and into the rigid back therefor.

5. Apparatus as defined in claim 1 in which the rigid back for the die having a resilient face is contoured with respect to a plane perpendicular to the direction of movement of said relatively movable die.

6. Apparatus as defined in claim 5 in which the thickness of the surface layer of the resilient elastomeric material on the die having a resilient face exceeds $\frac{1}{32}$ of an inch and is in the general order of the difference between the maximum and minimum thicknesses of the charge compacted between said relatively movable dies.

7. Apparatus as defined in claim 1 in which the maximum area of the rigid backing for the die having a resilient face lies in a plane perpendicular to the direction of relative movement of said dies while compacting said charge and the contour of the face of said dies lies within said resilient surface layer.

8. Apparatus as defined in claim 7 including a relatively rigid perimeter carried by said rigid back and extending around the perimeter of said relatively resilient layer to restrain the perimeter of said relatively rigid layer from movement in a direction perpendicular to the direction of movement of said dies while compacting said charge and under the pressure of compaction exerted on the resilient surface layer.

9. The method of dry pressing pulverulent ceramic material to form a compacted contoured article of green ware to be fired, said article having a relatively thin average depth of section, said method comprising the steps of measuring a charge of such pulverulent ceramic material having average particle sizes ranging from fine dusts in the order of fine clays up to 60 mesh, said charge having the weight of the desired article to be formed but an uncompacted volume greater than the volume of said article, placing said charge in the opened die cavity of apparatus defined in claim 1, the thickness of the resilient surface layer on a die face having been selected with respect to the particle size of said charge to permit flow of said pulverulent material transverse to the thickness of article during compaction, compacting said charge in said apparatus to an article of uniform surface density and glaze absortiveness, and then removing said article from said apparatus.

10. The method of claim 9 including the step, prior to compacting said charge, of distributing said charge over the face of one of said dies and pre-shaping, up to the extent the dry flow of the uncompacted pulverulent material permits, the exposed surface of said distributed charge to approximately the contour of the die face which engaged said exposed surface during the step of compacting said charge.

11. The method of claim 9 including the step, prior to firing, of fettling the edges of the compacted article removed from said apparatus.

References Cited by the Examiner

UNITED STATES PATENTS

| | | |
|---|---|---|
| 1,268,226 | Flood | June 4, 1918 |
| 1,461,563 | Schmiedeknecht | July 10, 1923 |
| 1,958,184 | Cross | May 8, 1934 |
| 2,091,973 | Fessler et al. | Sept. 7, 1937 |
| 2,092,001 | McDougal | Sept. 7, 1937 |
| 2,152,738 | Jeffery | Apr. 4, 1939 |
| 2,298,223 | Miller | Oct. 6, 1942 |
| 2,645,836 | Sorenson et al. | July 21, 1953 |
| 2,714,226 | Axelrad | Aug. 2, 1955 |
| 2,777,162 | Banzhof | Jan. 15, 1957 |
| 2,918,715 | Rossi | Dec. 29, 1959 |

OTHER REFERENCES

Ceramic Fabrication Processes, Kingery, John Wiley & sons, Inc., New York, April 1, 1959, Library of Congress Catalog Number 58-6077, pages 63 and 73-74 relied on.